(12) United States Patent
Hokao

(10) Patent No.: US 6,768,769 B2
(45) Date of Patent: Jul. 27, 2004

(54) RECEIVING CIRCUIT, MOBILE TERMINAL WITH RECEIVING CIRCUIT, AND METHOD OF RECEIVING DATA

(75) Inventor: Tomoaki Hokao, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/283,731

(22) Filed: Oct. 30, 2002

(65) Prior Publication Data

US 2003/0054781 A1 Mar. 20, 2003

Related U.S. Application Data

(63) Continuation of application No. 09/401,035, filed on Sep. 21, 1999.

(30) Foreign Application Priority Data

Sep. 29, 1998 (JP) ........................................ 1998-275703

(51) Int. Cl.[7] .............................................. H04B 1/707
(52) U.S. Cl. ......................... 375/148; 375/147; 375/349
(58) Field of Search ................................ 370/328, 335, 370/342, 341; 375/147, 148, 150, 347, 267, 340, 342, 343

(56) References Cited

U.S. PATENT DOCUMENTS

| 5,237,586 | A | 8/1993 | Bottomley |
| 5,737,326 | A | 4/1998 | I et al. |
| 5,887,021 | A | 3/1999 | Keskitelo et al. |
| 5,909,462 | A | 6/1999 | Kamerman et al. |
| 6,128,333 | A | * 10/2000 | Kinoshita et al. ........... 375/147 |
| 6,178,194 | B1 | 1/2001 | Vasic |
| 6,188,679 | B1 | * 2/2001 | Sato ........................... 370/335 |

FOREIGN PATENT DOCUMENTS

| EP | 0 820 156 | 1/1998 | |
| EP | 0 848-503 A2 | 6/1998 | |
| JP | 9-261120 | 10/1997 | |
| JP | 0848503 A2 | * 6/1998 | ........... H04B/1/707 |
| JP | 10-173630 | 6/1998 | |

OTHER PUBLICATIONS

Theodore Rappaport, Wireless Communications, 1996, Prentice Hall Inc., p. 336–337.*

* cited by examiner

Primary Examiner—Nay Maung
Assistant Examiner—Tanmay Lele
(74) Attorney, Agent, or Firm—Scully, Scott, Murphy & Presser

(57) ABSTRACT

A finger receiver has a data decision unit for deciding whether there is received data or not. If the data decision unit determines that there is received data, then a symbol data selector outputs, to a circuit at a later stage, accumulated and added symbol data at one of complex-inverse diffusing points in a plurality of phases, which is detected as having a maximum accumulated slot power value by a maximum value detector. If the data decision unit determines that there is no received data, then the symbol data selector outputs, to the circuit at the later stage, accumulated and added symbol data at the same point as the accumulated and added symbol data outputted in a preceding slot.

28 Claims, 12 Drawing Sheets

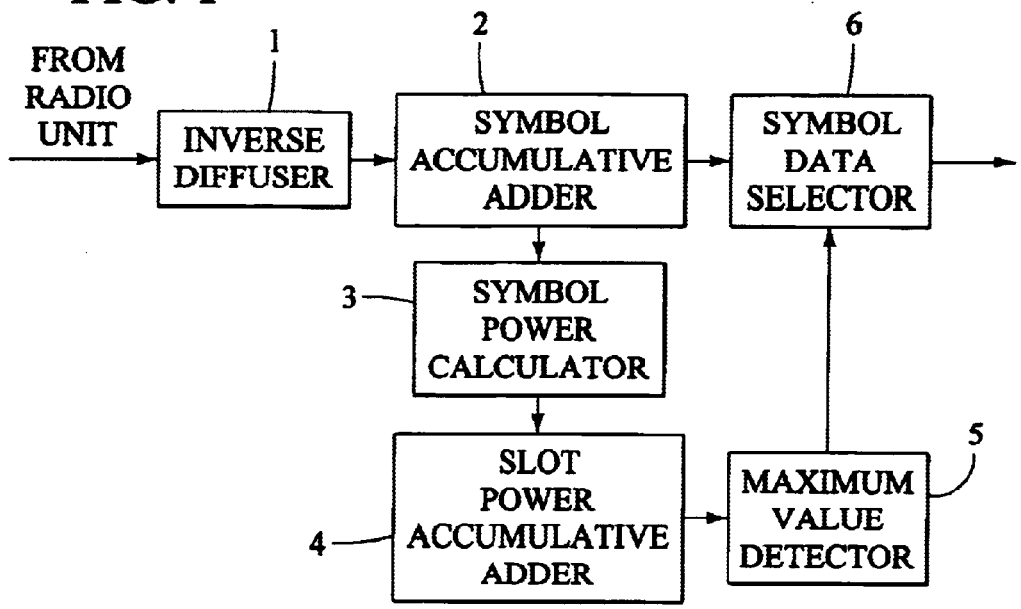
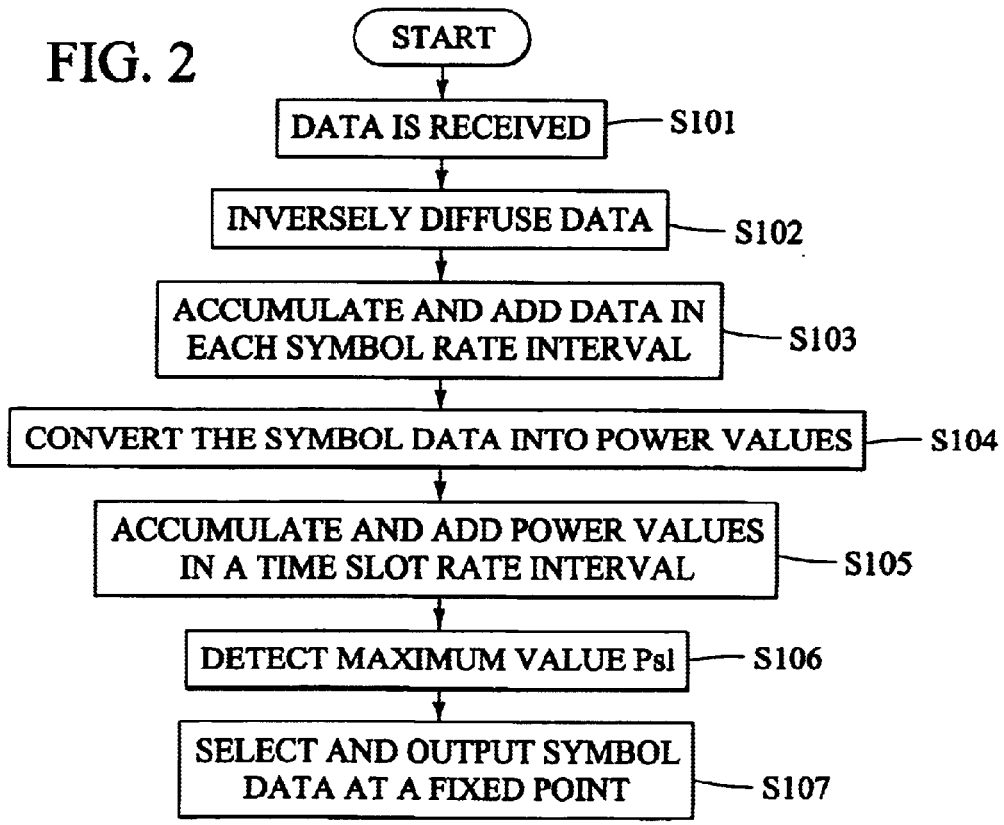

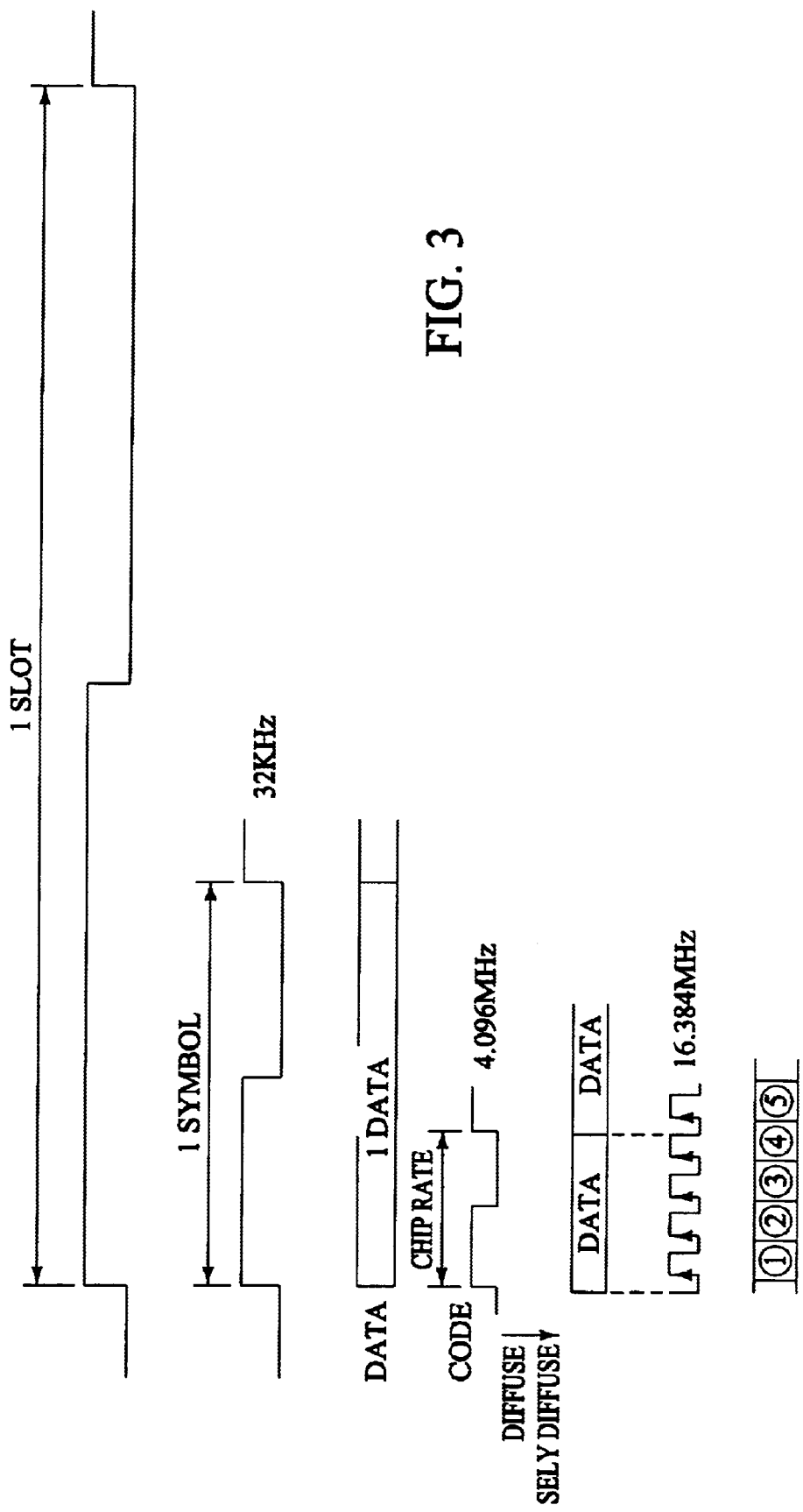

RECEIVING CIRCUIT, MOBILE TERMINAL WITH RECEIVING CIRCUIT, AND METHOD OF RECEIVING DATA

CROSS REFERENCE TO RELATED APPLICATION

This application is a continuation of U.S. patent application Ser. No. 09/401,035, filed on Sep. 21, 1999.

BACKGROUND OF THE INVENTION

1. Field of the Invention

The present invention relates to a mobile communication system based on the principles of CDMA (Code Division Multiplex Access), and more particularly to a receiving circuit in a mobile terminal in a mobile communication system based on the principles of CDMA.

2. Description of the Related Art

In recent years, mobile communication systems are finding a growing number of subscribers and are required to increase their capacity to accommodate subscribers. One approach to an increased capacity to accommodate subscribers is a technique known as CDMA in which one frequency band is shared by signals spread by a plurality of mathematically orthogonal codes.

In a CDMA mobile communication system, the receiving circuit of each mobile terminal has a plurality of finger receivers for inversely diffusing transmitted data in association with respective multiple paths. The transmitted data are inversely diffused by the finger receivers and then synthesized with each other.

FIG. 1 of the accompanying drawings shows in block form a finger receiver which is being experimentally studied by the inventors of the present application.

As shown in FIG. 1, the finger receiver comprises an inverse diffuser 1 for complex-inverse diffusing transmitted data at each chip rate for five points of $-1/2\pi$, $-1/4\pi$, $0\pi$, $+1/4\pi$, $+1/2\pi$ at 16.384 MHz with respect to a reference point, a symbol accumulative adder 2 for accumulating and adding the data complex-inverse diffused by the inverse diffuser 1 in each symbol rate interval with respect to the above five points, a symbol power calculator 3 for converting the symbol data accumulated and added by the symbol accumulative adder 2 into power values and outputting the power values, a slot power accumulative adder 4 for accumulating and adding the power values for the five points outputted from the symbol power calculator 3 in a slot rate interval, a maximum value detector 5 for detecting one of the five complex-inverse diffusing points where the accumulated slot power value is maximum, based on the result produced by the slot power accumulative adder 4, and a symbol data selector 6 for outputting, to a circuit at a later stage (not shown), the accumulated and added data at the point where the power value is maximum, which has been detected by the maximum value detector 5, of those the symbol data accumulated and added by the symbol accumulative adder 2.

Operation of the finger receiver shown in FIG. 1 will be described below.

FIG. 2 of the accompanying drawings is a flowchart of the operation of the finger receiver shown in FIG. 1, and FIG. 3 of the accompanying drawings shows received data, illustrating how the finger receiver shown in FIG. 1 operates.

When data transmitted from a base station facility (not shown) is received in step S101, the inverse diffuser 1 inversely diffuses the transmitted data at a chip rate of 4.096 MHz using an inversely diffusing code in step S102. In step S102, the chip rate is divided into four timings, and the transmitted data is inversely diffused for five points of $-1/2\pi$, $-1/4\pi$, $0\pi$, $+1/4\pi$, $+1/2\pi$ at 16.384 MHz.

Then, the symbol accumulative adder 2 accumulates and adds the data complex-inverse diffused by the inverse diffuser 1 in each symbol rate interval with respect to the above five points in step S103.

The symbol power calculator 3 converts the symbol data accumulated and added by the symbol accumulative adder 2 into power values and outputs the power values in step S104.

The slot power accumulative adder 4 accumulates and adds the power values at the five points outputted from the symbol power calculator 3 in one time slot rate interval in step S105.

Then, the maximum value detector 5 detects one of the five complex-inverse diffusing points where the accumulated slot power value is maximum, based on the result produced by the slot power accumulative adder 4 in step S106.

Thereafter, the point detected by the maximum value detector 5 is supplied to the symbol data selector 6. The symbol data selector 6 has been supplied with symbol data in a slot next to the slot where the accumulated slot power value is maximum as detected by the maximum value detector 5.

The symbol data selector 6 outputs, to a circuit at a later stage, the accumulated and added data at the point where the power value is maximum, which has been detected by the maximum value detector 5, i.e., the accumulated and added data at the point where the accumulated power is maximum as detected in the preceding slot, of those symbol data accumulated and added by the symbol accumulative adder 2 in step S107.

As described above, the chip rate is divided into a plurality of timings, and a received power is calculated at each of the timings. Data in a next slot at the timing where the received power is maximum is extracted and outputted to the circuit at the later stage for thereby increasing the quality of received data.

In a receiving circuit having finger receivers of the type described above, one of the five complex-inverse diffusing points where the accumulated slot power value is maximum is detected on the basis of the result produced by the slot power accumulative adder. If the transmitted data is burst data as in a paging channel (PCH), then the point where the accumulated slot power value is maximum is detected at a noise level for a slot free of received data, and data at the point detected as having the maximum value is extracted from the accumulated and added symbol data in a next slot and outputted to the circuit at the later stage. Therefore, an optimum complex-inverse diffusing point is not selected in the next slot, resulting in a degraded received-data quality.

SUMMARY OF THE INVENTION

It is therefore an object of the present invention to provide a receiving circuit which is capable of increasing the quality of received data even if transmitted data is burst data as in a paging channel.

To achieve the above object, there is provided in accordance with the present invention a receiving circuit comprising an antenna and a radio unit for receiving data, a plurality of finger receivers for inversely diffusing the data received by antenna and the radio unit in association with respective multiple paths, and a synthesizer for synthesizing datan inversely diffused by the finger receivers, each of the finger receivers comprising means for dividing a reception timing in each predetermined interval into a plurality of timings, inversely diffusing the received data at each of the timings, detecting one of the timings where a reception level is highest based on the inversely diffused data, and outputting data in a next interval at the detected timing.

Each of the finger receivers may comprise means for deciding whether there is received data or not based on the reception level at the timing where the reception level is highest, outputting the data in the next interval at the timing where the reception level is highest if it is determined that there is received data, and outputting the data in the next interval at the timing of presently outputting the data if it is determined that there is no received data.

Each of the finger receivers may comprise an inverse diffuser for dividing a chip rate into a plurality of reception timings and complex-inverse diffusing data received via the antenna and the radio unit at each of the reception timings, a symbol accumulative adder for accumulating and adding the data complex-inverse diffused by the inverse diffuser in each symbol rate interval at each of the reception timings, a symbol power calculator for converting symbol data accumulated and added by the symbol accumulative adder into power values and outputting the power values, a slot power accumulative adder for accumulating and adding the power values at the reception timings outputted from the symbol power calculator in a slot rate interval, a maximum value detector for detecting one of the reception timings where an accumulated slot power value is maximum based on a result produced by the slot power accumulative adder, a data decision unit for deciding whether there is received data or not based on the accumulated slot power value at the reception timing detected as having the maximum accumulated slot power value by the maximum value detector, and a symbol data selector for outputting accumulated and added symbol data at the reception timing detected as having the maximum accumulated slot power value by the maximum value detector, of those symbol data accumulated and added by the symbol accumulative adder if the data decision unit determines that there is received data, and outputting accumulated and added symbol data at the same reception timing as the accumulated and added symbol data outputted in a preceding slot, of those symbol data accumulated and added by the symbol accumulative adder if the data decision unit determines that there is no received data.

The data decision unit may comprise means for comparing the accumulated slot power value at the reception timing detected as having the maximum accumulated slot power value by the maximum value detector, with a predetermined threshold value thereby to decide whether there is received data or not.

Each of the finger receivers may have a switching unit for outputting the reception timing detected as having the maximum accumulated slot power value by the maximum value detector only if the data decision unit determines that there is received data, the symbol data selector comprising means for outputting accumulated and added symbol data at the reception timing detected as having the maximum accumulated slot power value by the maximum value detector, of those symbol data accumulated and added by the symbol accumulative adder if the symbol data selector is supplied with the reception timing detected as having the maximum accumulated slot power value by the maximum value detector via the switching unit, and outputting accumulated and added symbol data at the same reception timing as the accumulated and added symbol data outputted in the preceding slot, of those symbol data accumulated and added by the symbol accumulative adder if the symbol data selector is not supplied with the reception timing detected as having the maximum accumulated slot power value by the maximum value detector via the switching unit.

Alternatively, each of the finger receivers may comprise an inverse diffuser for dividing a chip rate into a plurality of reception timings and complex-inverse diffusing data received via the antenna and the radio unit at each of the reception timings, a symbol accumulative adder for accumulating and adding the data complex-inverse diffused by the inverse diffuser in each symbol rate interval at each of the reception timings, a symbol power calculator for converting symbol data accumulated and added by the symbol accumulative adder into power values and outputting the power values, a maximum value detector for detecting one of the reception timings where a symbol power value is maximum based on the power values at the reception timings outputted from the symbol power calculator, a data decision unit for deciding whether there is received data or not based on the symbol power value at the reception timing detected as having the maximum symbol power value by the maximum value detector, and a symbol data selector for outputting accumulated and added symbol data at the reception timing detected as having the maximum symbol power value by the maximum value detector, of those symbol data accumulated and added by the symbol accumulative adder if the data decision unit determines that there is received data, and outputting accumulated and added symbol data at the same reception timing as the accumulated and added symbol data outputted with a preceding symbol, of those symbol data accumulated and added by the symbol accumulative adder if the data decision unit determines that there is no received data.

The data decision unit may comprise means for comparing the symbol power value at the reception timing detected as having the maximum symbol power value by the maximum value detector, with a predetermined threshold value thereby to decide whether there is received data or not.

Each of the finger receivers may have a switching unit for outputting the reception timing detected as having the maximum symbol power value by the maximum value detector only if the data decision unit determines that there is received data, the symbol data selector comprising means for outputting accumulated and added symbol data at the reception timing detected as having the maximum symbol power value by the maximum value detector, of those symbol data accumulated and added by the symbol accumulative adder if the symbol data selector is supplied with the reception timing detected as having the maximum symbol power value by the maximum value detector via the switching unit, and outputting accumulated and added symbol data at the same reception timing as the accumulated and added symbol data outputted with the preceding symbol, of those symbol data accumulated and added by the symbol accumulative adder if the symbol data selector is not supplied with the reception timing detected as having the maximum symbol power value by the maximum value detector via the switching unit.

Alternatively, each of the finger receivers may comprise an inverse diffuser for dividing a chip rate into a plurality of reception timings and complex-inverse diffusing data received via the antenna and the radio unit at each of the reception timings, a symbol accumulative adder for accumulating and adding the data complex-inverse diffused by the inverse diffuser in each symbol rate interval at each of the reception timings, a symbol S/N ratio calculator for calculating S/N ratios of received data from symbol data accumulated and added by the symbol accumulative adder and outputting the calculated S/N ratios, a slot S/N ratio accumulative adder for accumulating and adding the S/N ratios at the reception timings outputted from the symbol S/N ratio calculator, a maximum value detector for detecting one of the reception timings where an accumulated slot S/N ratio is maximum based on a result produced by the slot S/N ratio accumulative adder, a data decision unit for deciding whether there is received data or not based on the accumulated slot S/N ratio at the reception timing detected as having the maximum accumulated slot S/N ratio by the maximum value detector, and a symbol data selector for outputting accumulated and added symbol data at the reception timing detected as having the maximum accumulated slot S/N ratio by the maximum value detector, of those symbol data accumulated and added by the symbol accumulative adder if the data decision unit determines that there is received data, and outputting accumulated and added symbol data at the same reception timing as the accumulated and added symbol data outputted in a preceding slot, of those symbol data accumulated and added by the symbol accumulative adder if the data decision unit determines that there is no received data.

The data decision unit may comprise means for comparing the accumulated slot S/N ratio at the reception timing detected as having the maximum accumulated slot S/N ratio by the maximum value detector, with a predetermined threshold value thereby to decide whether there is received data or not.

Each of the finger receivers may have a switching unit for outputting the reception timing detected as having the maximum accumulated slot S/N ratio by the maximum value detector only if the data decision unit determines that there is received data, the symbol data selector comprising means for outputting accumulated and added symbol data at the reception timing detected as having the maximum accumulated slot S/N ratio by the maximum value detector, of those symbol data accumulated and added by the symbol accumulative adder if the symbol data selector is supplied with the reception timing detected as having the maximum accumulated slot S/N ratio by the maximum value detector via the switching unit, and outputting accumulated and added symbol data at the same reception timing as the accumulated and added symbol data outputted in the preceding slot, of those symbol data accumulated and added by the symbol accumulative adder if the symbol data selector is not supplied with the reception timing detected as having the maximum accumulated slot S/N ratio by the maximum value detector via the switching unit.

Further alternatively, each of the finger receivers may comprise an inverse diffuser for dividing a chip rate into a plurality of reception timings and complex-inverse diffusing data received via the antenna and the radio unit at each of the reception timings, a symbol accumulative adder for accumulating and adding the data complex-inverse diffused by the inverse diffuser in each symbol rate interval at each of the reception timings, a symbol S/N ratio calculator for calculating S/N ratios of received data from symbol data accumulated and added by the symbol accumulative adder and outputting the calculated S/N ratios, a maximum value detector for detecting one of the reception timings where a symbol S/N ratio is maximum based on the S/N ratios at the reception timings outputted from the symbol S/N ratio calculator, a data decision unit for deciding whether there is received data or not based on the symbol S/N ratio at the reception timing detected as having the maximum symbol S/N ratio by the maximum value detector, and a symbol data selector for outputting accumulated and added symbol data at the reception timing detected as having the maximum symbol S/N ratio by the maximum value detector, of those symbol data accumulated and added by the symbol accumulative adder if the data decision unit determines that there is received data, and outputting accumulated and added symbol data at the same reception timing as the accumulated and added symbol data outputted with a preceding symbol, of those symbol data accumulated and added by the symbol accumulative adder if the data decision unit determines that there is no received data.

The data decision unit may comprise means for comparing the symbol S/N ratio at the reception timing detected as having the maximum symbol S/N ratio by the maximum value detector, with a predetermined threshold value thereby to decide whether there is received data or not.

Each of the finger receivers may have a switching unit for outputting the reception timing detected as having the maximum symbol S/N ratio by the maximum value detector only if the data decision unit determines that there is received data, the symbol data selector comprising means for outputting accumulated and added symbol data at the reception timing detected as having the maximum symbol S/N ratio by the maximum value detector, of those symbol data accumulated and added by the symbol accumulative adder if the symbol data selector is supplied with the reception timing detected as having the maximum symbol S/N ratio by the maximum value detector via the switching unit, and outputting accumulated and added symbol data at the same reception timing as the accumulated and added symbol data outputted with the preceding symbol, of those symbol data accumulated and added by the symbol accumulative adder if the symbol data selector is not supplied with the reception timing detected as having the maximum symbol S/N ratio by the maximum value detector via the switching unit.

According to the present invention, there is also provided a mobile terminal in a mobile communication system, the mobile terminal having the receiving circuit described above.

According to the present invention, there is further provided a method of receiving data transmitted by way of mobile communications, comprising the steps of dividing a reception timing in each predetermined interval into a plurality of timings and inversely diffusing the received data at each of the timings, detecting one of the timings where a reception level is highest based on the inversely diffused data, and outputting data in a next interval at the detected timing.

The method may further comprise the steps of deciding whether there is received data or not based on the reception level at the timing where the reception level is highest, outputting the data in the next interval at the timing where the reception level is highest if it is determined that there is received data, and outputting the data in the next interval at the timing of presently outputting the data if it is determined that there is no received data.

With the arrangement of the present invention, as described above, in the finger receivers, the reception timing in each predetermined interval is divided into a plurality of timings, and the received data is inversely diffused at each of the timings. Based on the inversely diffused data, the timing where the reception level is the highest is detected, and data in a next interval is outputted at the detected timing. Therefore, the quality of received data can be increased.

Whether there is received data or not is decided based on the reception level at the timing where the reception level is the highest. If it is determined that there is received data, then data in a next interval is outputted at the timing where the reception level is the highest. If it is determined that there is no received data, then data in a next interval is outputted at the timing of presently outputting data. In such an arrangement, if the received data is burst data as in a paging channel, then since the detection of timing in the data is not reflected in the outputting of the data, the quality of received data can be increased even though the received data is burst data as in a paging channel.

The above and other objects, features, and advantages of the present invention will become apparent from the following description with reference to the accompanying drawings which illustrate examples of the present invention.

BRIEF DESCRIPTION OF THE DRAWINGS

FIG. 1 is a block diagram of a finger receiver which is being experimentally studied by the inventors of the present application;

FIG. 2 is a flowchart of the operation of the finger receiver shown in FIG. 1;

FIG. 3 is a diagram showing received data, illustrating how the finger receiver shown in FIG. 1 operates;

DETAILED DESCRIPTION OF THE PREFERRED EMBODIMENTS

Figure 4:
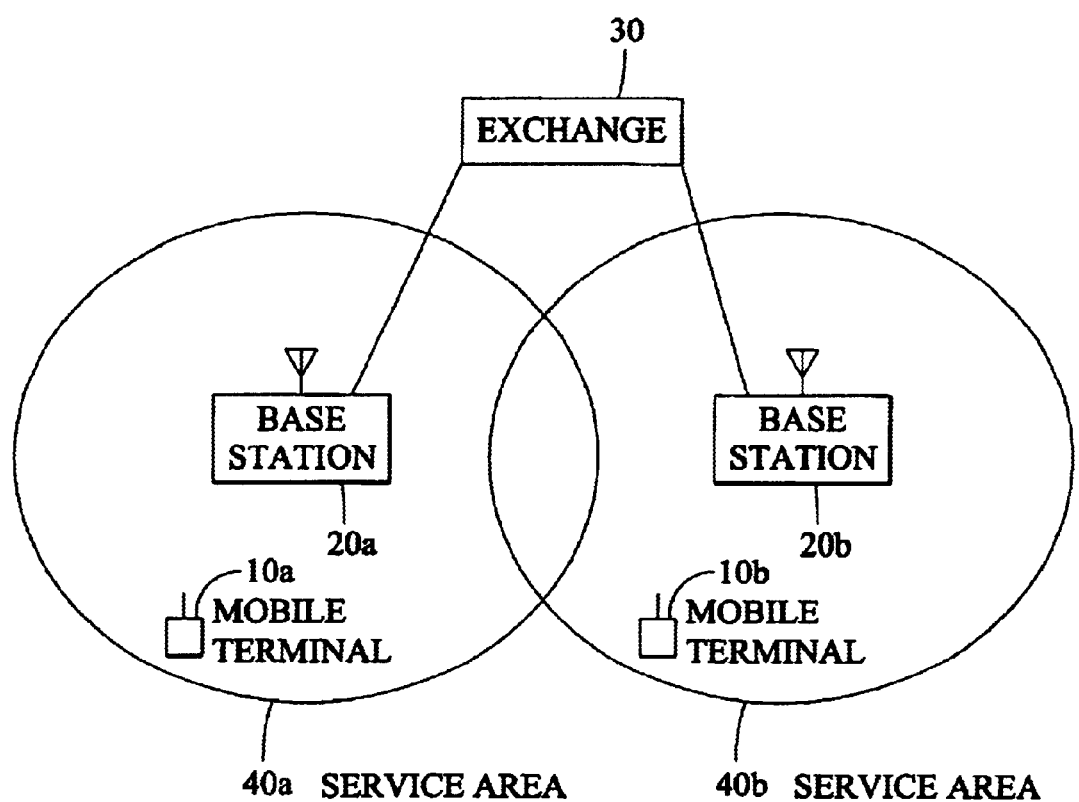
FIG. 4 is a diagram of a mobile communication system including mobile terminals each having a receiving circuit according to the present invention.

FIG. 4 shows in block form a mobile communication system including mobile terminals each having a receiving circuit according to the present invention.

As shown in FIG. 4, the mobile communication system has a plurality of mobile terminals 10a, 10b each having a receiving circuit according to the present invention, a plurality of base stations 20a, 20b covering respective service areas 40a, 40b and connected to the mobile terminals 10a, 10b via radio links, and an exchange 30 for performing switching control for the base stations 20a, 20b. Though only two base stations 20a, 20b and two base stations 20a, 20b are illustrated in FIG. 4, the mobile communication system actually has a plurality of mobile terminals more than two mobile stations and a plurality of base stations more than two base stations.

When the mobile terminals 10a, 10b are present in the service area 40a covered by the base station 20a, the mobile terminals 10a, 10b receive a service from the base station 20a. When the mobile terminals 10a, 10b are present in the service area 40b covered by the base station 20b, the mobile terminals 10a, 10b receive a service from the base station 20b.

Figure 5:
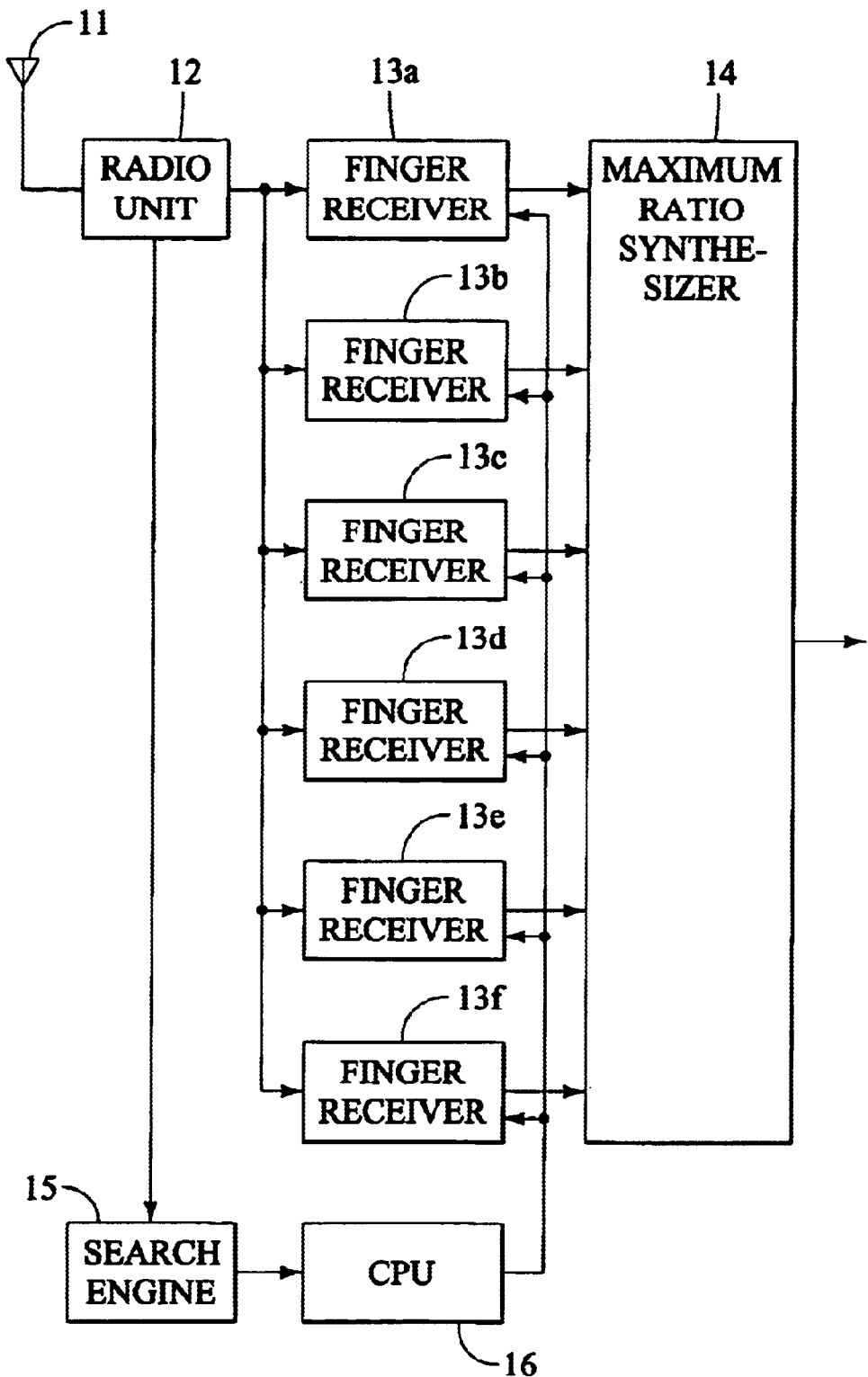
FIG. 5 is a block diagram of the receiving circuit in each of the mobile terminals shown in FIG. 4.

FIG. 5 shows in block form the receiving circuit in each of the mobile terminals 10a, 10b shown in FIG. 4.

As shown in FIG. 5, the receiving circuit comprises an antenna 11 and a radio unit 12 for receiving data, a plurality of finger receivers 13a through 13f for inversely diffusing the data received via the antenna 11 and the radio unit 12, in association with a plurality of multiple paths, a maximum ratio synthesizer 14 for synthesizing the datan inversely diffused by the finger receivers 13a through 13f, a search engine 15 for detecting respective components of the multiple paths, and a CPU 16 for controlling operation of the finger receivers 13a through 13f based on the components detected by the search engine 15.

The receiving circuit constructed as shown in FIG. 5 operates as follows: When data is received by the antenna 11 and the radio unit 12, the received data is inversely diffused by the finger receivers 13a through 13f, and data k inversely diffused by the finger receivers 13a through 13f are synthesized by the maximum ratio synthesizer 14, which outputs synthesized data to a circuit at a later stage (not shown).

Several specific embodiments of finger receivers will be described in detail below.

Figure 6:
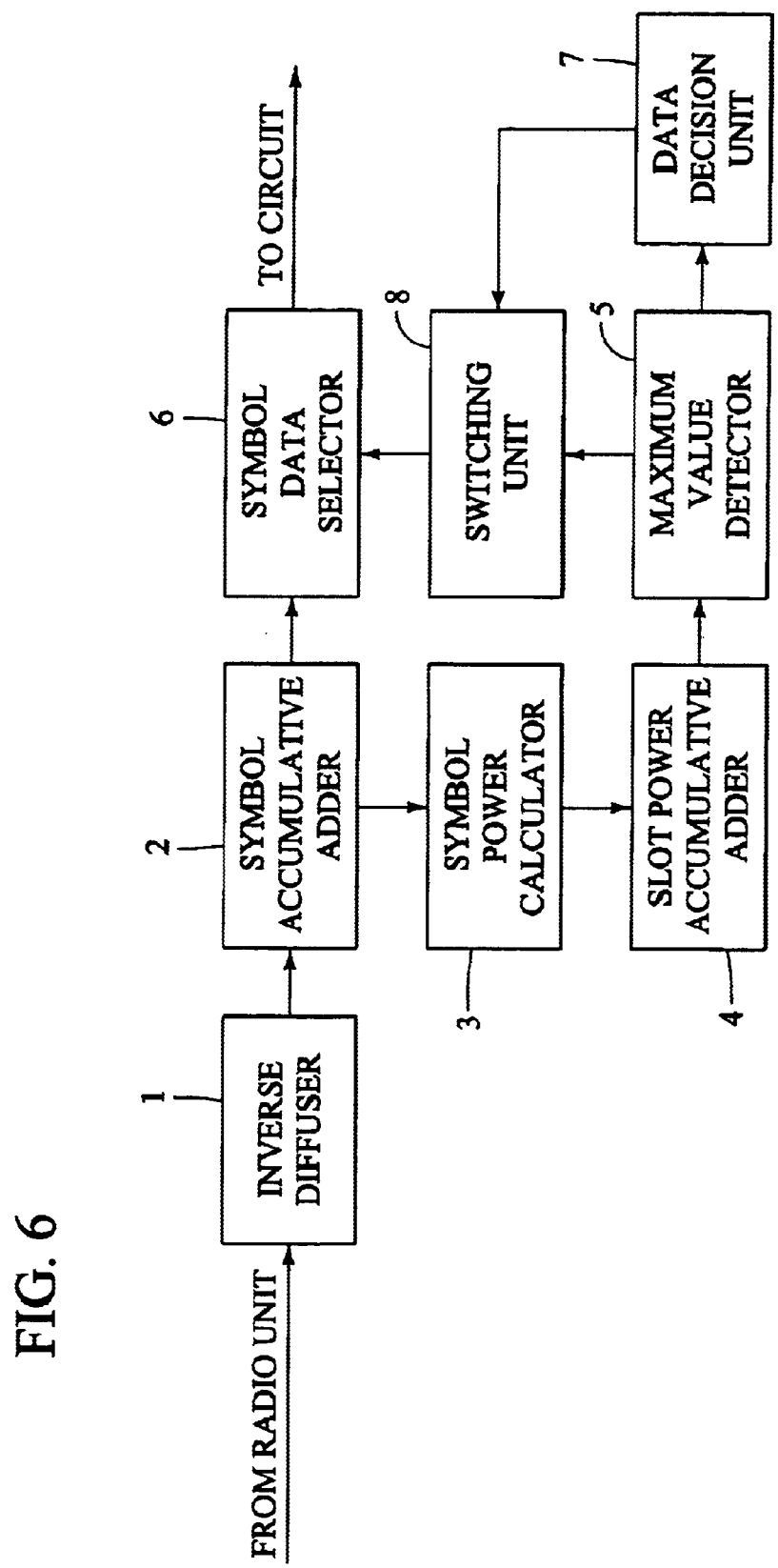
FIG. 6 is a block diagram of a finger receiver according to a first embodiment of the present invention, for use in the receiving circuit shown in FIG. 5.

1st Embodiment:

FIG. 6 shows in block form a finger receiver according to a first embodiment of the present invention, for use as each of the finger receivers 13a through 13f in the receiving circuit shown in FIG. 5.

As shown in FIG. 6, the finger receiver comprises an inverse diffuser 1 for complex-inverse diffusing the data received via the antenna 11 and the radio unit 12, at each chip rate for five points of $-1/2\pi$, $-1/4\pi$, $0\pi$, $+1/4\pi$, $+1/2\pi$ at 16.384 MHz with respect to a reference point, a symbol accumulative adder 2 for accumulating and adding the data complex-inverse diffused by the inverse diffuser 1 in each symbol rate interval with respect to the above five points, a symbol power calculator 3 for converting the symbol data accumulated and added by the symbol accumulative adder 2 into power values and outputting the power values, a slot power accumulative adder 4 for accumulating and adding the power values for the five points outputted from the symbol power calculator 3 in a slot rate interval, a maximum value detector 5 for detecting one of the five complex-inverse diffusing points where the accumulated slot power value is maximum, based on the result produced by the slot power accumulative adder 4, a data decision unit 7 for comparing the accumulated slot power value at the point detected as having the maximum accumulated slot power value by the maximum value detector 5 with a predetermined threshold value, and deciding whether there is received data or not based on the result of comparison, a switching unit 8 for outputting the point detected as having the maximum accumulated slot power value by the maximum value detector 5 only if the data decision unit 7 determines that there is received data, and a symbol data selector 6 for outputting, to a circuit at a later stage (not shown), the accumulated and added symbol data at the point detected as having the maximum accumulated slot power value by the maximum value detector 5, of those symbol data accumulated and added by the symbol accumulative adder 2, if the symbol data selector 6 is supplied with the point detected as having the maximum accumulated slot power value by the maximum value detector 5 via the switching unit 8, and outputting, to the circuit at the later stage, the accumulated and added symbol data at the same point as the accumulated and added symbol data outputted in a preceding slot, of those symbol data accumulated and added by the symbol accumulative adder 2, if the symbol data selector 6 is not supplied with the point detected as having the maximum accumulated slot power value by the maximum value detector 5 via the switching unit 8.

Operation of the finger receiver constructed as shown in FIG. 6 will be described below.

Figure 7:
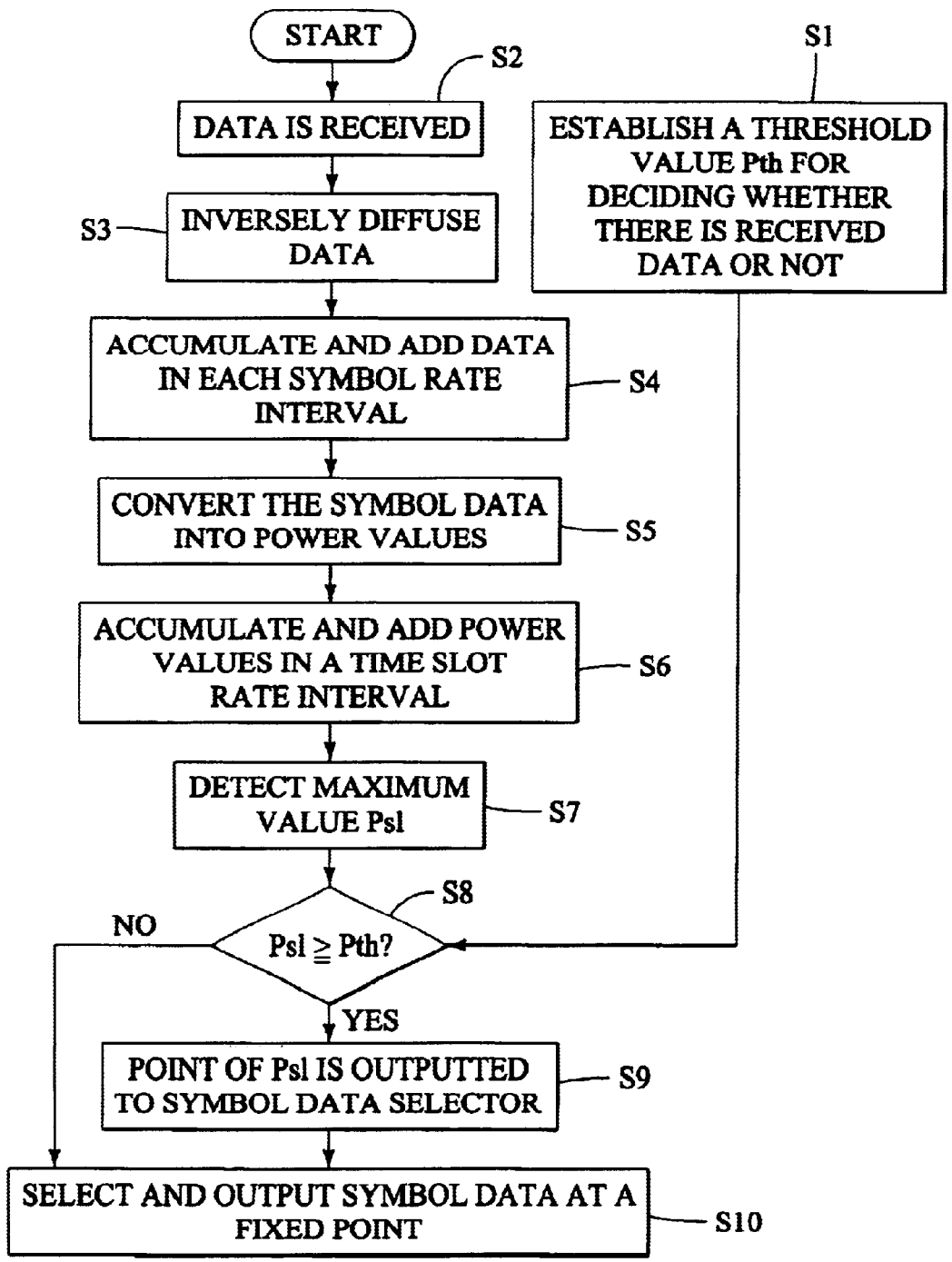
FIG. 7 is a flowchart of an operation sequence of the finger receiver shown in FIG. 6.

FIG. 7 shows an operation sequence of the finger receiver shown in FIG. 6.

The data decision unit 7 establishes a threshold value Pth for deciding whether there is received data or not in step S1. If the slot power value accumulated and added by the slot power accumulative adder 4 is equal to or greater than the threshold value Pth established by the data decision unit 7, then the data decision unit 7 determines that there is received data.

Data is received via the antenna 11 and the radio unit 12 in step S2. Then, the inverse diffuser 1 inversely diffuses the received data at each chip rate for five points of $1/2\pi$, $-1/4\pi$, $0\pi$, $+1/4\pi$, $+1/2\pi$ at 16.384 MHz with respect to a reference point in step S3.

Then, the symbol accumulative adder 2 accumulates and adds the data complex-inverse diffused by the inverse diffuser 1 in each symbol rate interval with respect to the above five points in step S4.

The symbol power calculator 3 converts the symbol data accumulated and added by the symbol accumulative adder 2 into power values and outputs the power values at the five points in step S5.

The slot power accumulative adder 4 accumulates and adds the power values at the five points outputted from the symbol power calculator 3 in a time slot rate interval, thus calculating a slot power value in step S6.

Then, the maximum value detector 5 detects one of the five complex-inverse diffusing points where the accumulated slot power value is maximum, based on the result produced by the slot power accumulative adder 4 in step S7.

The data decision unit 7 compares the threshold value Pth established in step S1 and a slot power value Psl at the point detected in step S7 with each other in step S8. If the slot power value Psl is equal to or greater than the threshold value Pth, then the data decision unit 7 determines that there is received data. If the slot power value Psl is smaller than the threshold value Pth, then the data decision unit 7 determines that there is no received data.

If the data decision unit 7 determines that there is received data, then the point detected as having the maximum accumulated slot power value by the maximum value detector 5 is outputted via the switch unit 8 to the symbol data selector 6 in step S9.

If the symbol data selector 6 is supplied with the point detected as having the maximum accumulated slot power value by the maximum value detector 5 via the switch unit 8, then the symbol data selector 6 outputs, to the circuit at the later stage, the accumulated and added symbol data at the point detected as having the maximum accumulated slot power value by the maximum value detector 5, of those symbol data accumulated and added by the symbol accumulative adder 2, and if the symbol data selector 6 is not supplied with the point detected as having the maximum accumulated slot power value by the maximum value detector 5 via the switch unit 8, then the symbol data selector 6 outputs, to the circuit at the later stage, the accumulated and added symbol data at the same point as the accumulated and added symbol data outputted in the preceding slot, of those symbol data accumulated and added by the symbol accumulative adder 2, in step S10.

2nd Embodiment:

In the first embodiment, the data decision unit decides whether there is received data or not by comparing the power value accumulated and added in the slot rate interval with the predetermined threshold value. However, the data decision unit may decide whether there is received data or not by comparing the power value for each symbol with a predetermined threshold value.

Figure 8:
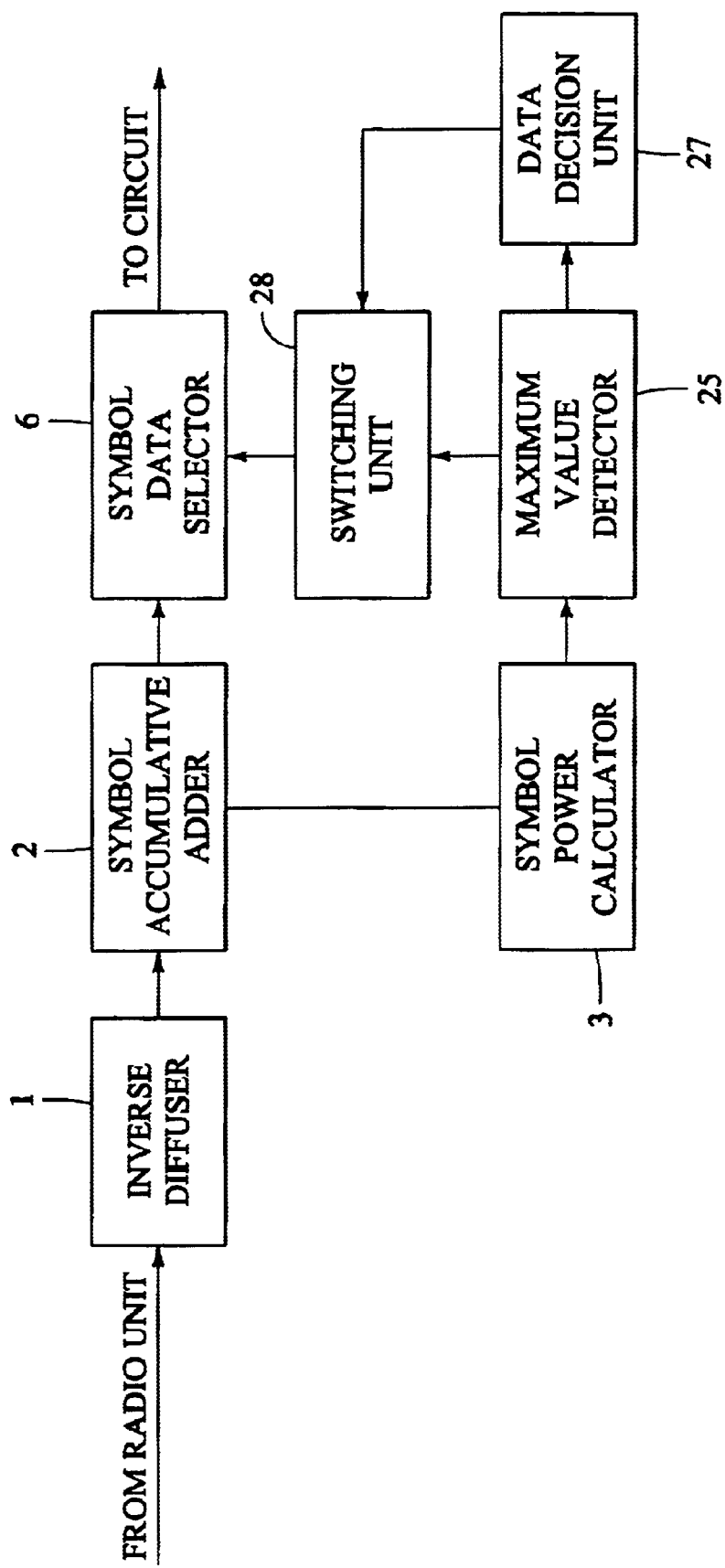
FIG. 8 is a block diagram of a finger receiver according to a second embodiment of the present invention, for use in the receiving circuit shown in FIG. 5.

FIG. 8 shows in block form a finger receiver according to a second embodiment of the present invention, for use as each of the finger receivers 13a through 13f in the receiving circuit shown in FIG. 5.

As shown in FIG. 8, the finger receiver comprises an inverse diffuser 1 for complex-inverse diffusing the data received via the antenna 11 and the radio unit 12, at each chip rate for five points of $-1/2\pi$, $-1/4\pi$, $0\pi$, $+1/4\pi$, $+1/2\pi$ at 16.384 MHz with respect to a reference point, a symbol accumulative adder 2 for accumulating and adding the data complex-inverse diffused by the inverse diffuser 1 in each symbol rate interval with respect to the above five points, a symbol power calculator 3 for converting the symbol data accumulated and added by the symbol accumulative adder 2 into power values and outputting the power values, a maximum value detector 25 for detecting one of the five complex-inverse diffusing points where the symbol power value is maximum, based on the power values at the five points outputted from the symbol power calculator 3, a data decision unit 27 for comparing the symbol power value at the point detected as having the maximum symbol power value by the maximum value detector 25 with a predetermined threshold value, and deciding whether there is received data or not based on the result of comparison, a switching unit 28 for outputting the point detected as having the maximum symbol power value by the maximum value detector 25 only if the data decision unit 217 determines that there is received data, and a symbol data selector 6 for outputting, to a circuit at a later stage (not shown), the accumulated and added symbol data at the point detected as having the maximum symbol power value by the maximum value detector 25, of those symbol data accumulated and added by the symbol accumulative adder 2, if the symbol data selector 6 is supplied with the point detected as having the maximum symbol power value by the maximum value detector 25 via the switching unit 28, and outputting, to the circuit at the later stage, the accumulated and added symbol data at the same point as the accumulated and added symbol data outputted with a preceding symbol, of those symbol data accumulated and added by the symbol accumulative adder 2, if the symbol data selector 6 is not supplied with the point detected as having the maximum symbol power value by the maximum value detector 25 via the switching unit 28.

Operation of the finger receiver constructed as shown in FIG. 8 will be described below.

Figure 9:
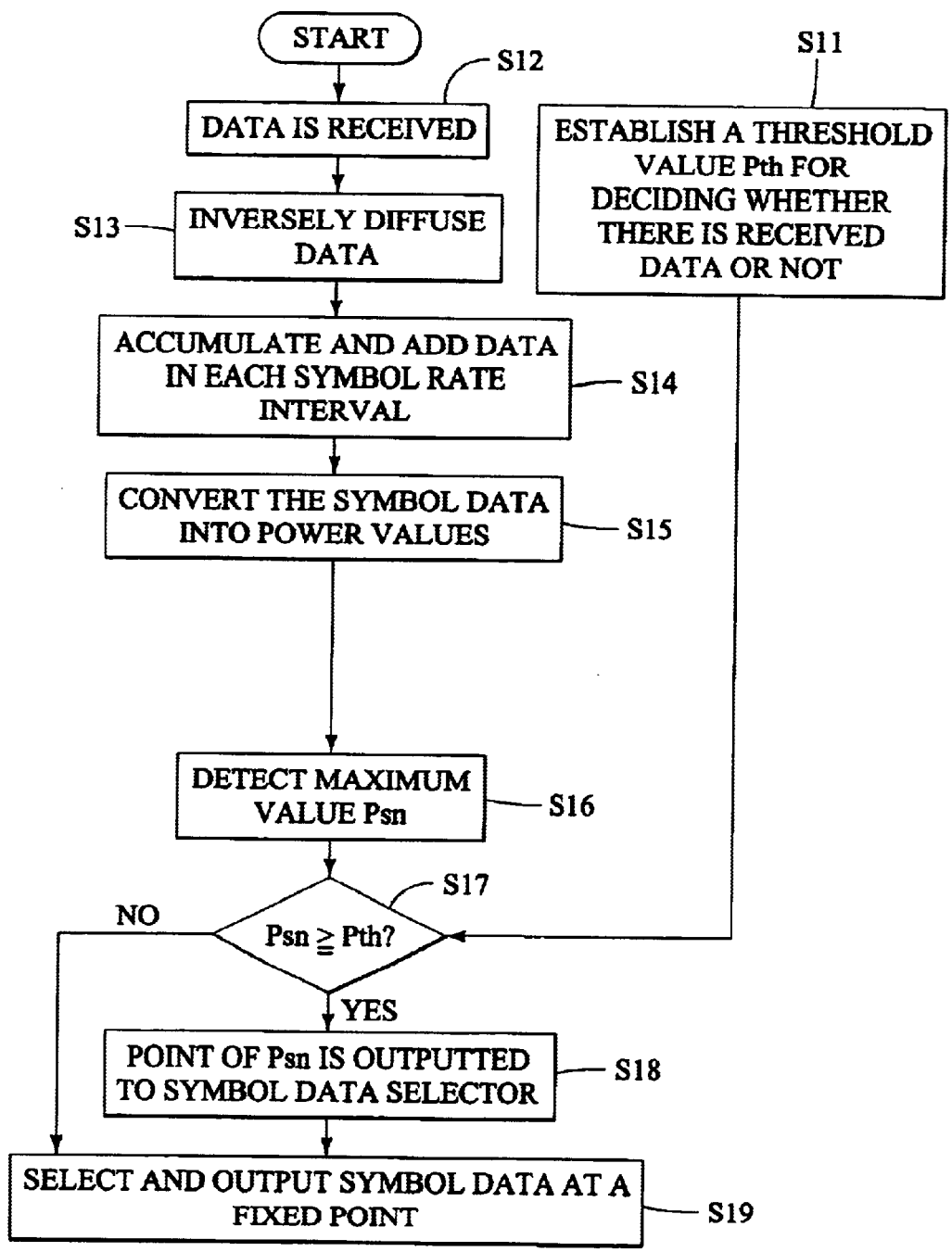
FIG. 9 is a flowchart of an operation sequence of the finger receiver shown in FIG. 8.

FIG. 9 shows an operation sequence of the finger receiver shown in FIG. 8.

The data decision unit 7 establishes a threshold value Pth for deciding whether there is received data or not in step S11. If the symbol power value calculated by the symbol power calculator 3 is equal to or greater than the threshold value Pth established by the data decision unit 7, then the data decision unit 7 determines that there is received data.

Data is received via the antenna 11 and the radio unit 12 in step S12. Then, the inverse diffuser 1 inversely diffuses the received data at each chip rate for five points of $-1/2\pi$, $-1/4\pi$, $0\pi$, $+1/4\pi$, $+1/2\pi$ at 16.384 MHz with respect to a reference point in step S13.

Then, the symbol accumulative adder 2 accumulates and adds the data complex-inverse diffused by the inverse diffuser 1 in each symbol rate interval with respect to the above five points in step S14.

The symbol power calculator 3 converts the symbol data accumulated and added by the symbol accumulative adder 2 into power values and outputs the power values at the five points in step S15.

Then, the maximum value detector 25 detects one of the five complex-inverse diffusing points where the symbol power value is maximum, based on the power values at the five points outputted from the symbol power calculator 3 in step S16.

The data decision unit 27 compares the threshold value Pth established in step S11 and a symbol power value Psn at the point detected in step S17 with each other in step S17. If the symbol power value Psn is equal to or greater than the threshold value Pth, then the data decision unit 27 determines that there is received data. If the symbol power value Psn is smaller than the threshold value Pth, then the data decision unit 27 determines that there is no received data.

If the data decision unit 27 determines that there is received data, then the point detected as having the maximum symbol power value by the maximum value detector 25 is outputted via the switch unit 28 to the symbol data selector 6 in step S18.

If the symbol data selector 6 is supplied with the point detected as having the maximum symbol power value by the maximum value detector 25 via the switch unit 28, then the symbol data selector 6 outputs, to the circuit at the later stage, the accumulated and added symbol data at the point detected as having the maximum symbol power value by the maximum value detector 25, of those symbol data accumulated and added by the symbol accumulative adder 2, and if the symbol data selector 6 is not supplied with the point detected as having the maximum symbol power value by the maximum value detector 25 via the switch unit 28, then the symbol data selector 6 outputs, to the circuit at the later stage, the accumulated and added symbol data at the same point as the accumulated and added symbol data outputted with the preceding symbol, of those symbol data accumulated and added by the symbol accumulative adder 2, in step S19.

3rd Embodiment:

In the first and second embodiments, the power value accumulated and added in a slot rate interval or the power value of each symbol is compared with the predetermined threshold value to decide whether there is received data or not. However, an S/N ratio of received data may be calculated and compared with a predetermined threshold value, and if the calculated SIN ratio of received data is equal to or greater than the threshold value, then it may be determined that there is received data.

Figure 10:
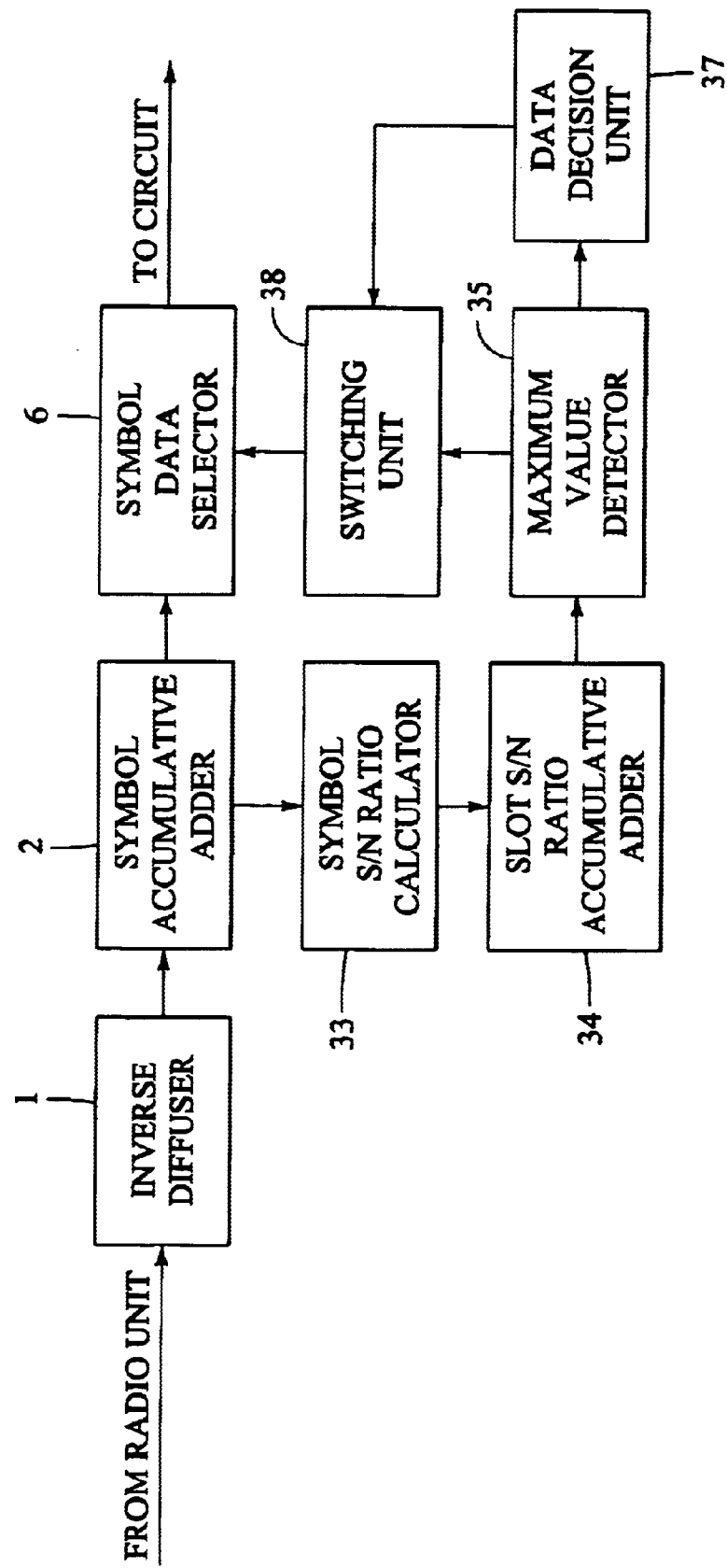
FIG. 10 is a block diagram of a finger receiver according to a third embodiment of the present invention, for use in the receiving circuit shown in FIG. 5.

FIG. 10 shows in block form a finger receiver according to a third embodiment of the present invention, for use as each of the finger receivers 13a through 13f in the receiving circuit shown in FIG. 5.

As shown in FIG. 10, the finger receiver comprises an inverse diffuser 1 for complex-inverse diffusing the data received via the antenna 11 and the radio unit 12, at each chip rate for five points of $-1/2\pi$, $-1/4\pi$, $0\pi$, $+1/4\pi$, $+1/2$ at 16.384 MHz with respect to a reference point, a symbol accumulative adder 2 for accumulating and adding the data complex-inverse diffused by the inverse diffuser 1 in each symbol rate interval with respect to the above five points, a symbol S/N ratio calculator 33 for calculating and outputting S/N ratios of received data from symbol data accumulated and added by the symbol accumulative adder 2, a slot S/N ratio accumulative adder 34 for accumulating and adding in a slot rate interval the S/N ratios at the five points outputted from the symbol S/N ratio calculator 33, a maximum value detector 35 for detecting one of the five complex-inverse diffusing points where the accumulated slot S/N ratio is maximum, based on the result produced by the slot S/N ratio accumulative adder 34, a data decision unit 37 for comparing the accumulated slot S/N ratio at the point detected as having the maximum accumulated slot S/N ratio by the maximum value detector 35 with a predetermined threshold value, and deciding whether there is received data or not based on the result of comparison, a switching unit 38 for outputting the point detected as having the maximum accumulated slot S/N ratio by the maximum value detector 35 only if the data decision unit 37 determines that there is received data, and a symbol data selector 6 for outputting, to a circuit at a later stage (not shown), the accumulated and added symbol data at the point detected as having the maximum accumulated slot S/N ratio by the maximum value detector 35, of those symbol data accumulated and added by the symbol accumulative adder 2, if the symbol data selector 6 is supplied with the point detected as having the maximum accumulated slot S/N ratio by the maximum value detector 35 via the switching unit 38, and outputting, to the circuit at the later stage, the accumulated and added symbol data at the same point as the accumulated and added symbol data outputted in a preceding slot, of those symbol data accumulated and added by the symbol accumulative adder 2, if the symbol-data selector 6 is not supplied with the point detected as having the maximum accumulated slot S/N ratio by the maximum value detector 35 via the switching unit 38.

Operation of the finger receiver constructed as shown in FIG. 10 will be described below.

Figure 11:
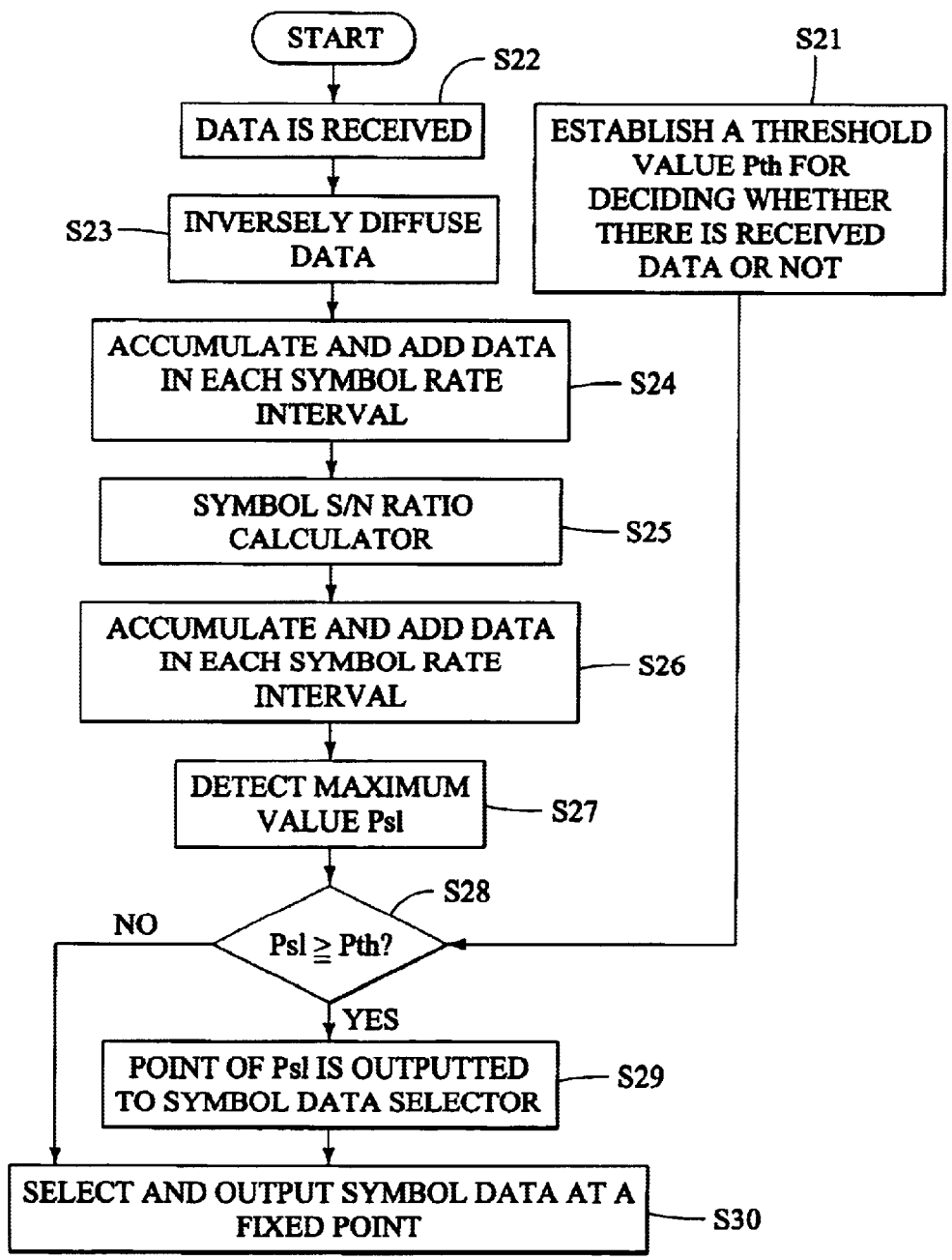
FIG. 11 is a flowchart of an operation sequence of the finger receiver shown in FIG. 10.

FIG. 11 shows an operation sequence of the finger receiver shown in FIG. 10.

The data decision unit 37 establishes a threshold value Pth for deciding whether there is received data or not in step S21. If the slot S/N ratio accumulated and added by the slot S/N ratio accumulative adder 34 is equal to or greater than the threshold value Pth established by the data decision unit 37, then the data decision unit 37 determines that there is received data.

Data is received via the antenna 11 and the radio unit 12 in step S22. Then, the inverse diffuser 1 inversely diffuses the received data at each chip rate for five points of $-1/2\pi$, $-1/4\pi$, $0\pi$, $+1/4\pi$, $+1/2\pi$ at 16.384 MHz with respect to a reference point in step S23.

Then, the symbol accumulative adder 2 accumulates and adds the data complex-inverse diffused by the inverse diffuser 1 in each symbol rate interval with respect to the above five points in step S24.

The symbol S/N ratio calculator 33 calculates S/N ratios of received data from symbol data accumulated and added by the symbol accumulative adder 2, and outputs the calculated S/N ratios at the five points in step S25.

The slot S/N ratio accumulative adder 34 accumulates and adds in a slot rate interval the S/N ratios at the five points outputted from the symbol S/N ratio calculator 33, thereby calculating an accumulated slot S/N ratio in step S26.

The maximum value detector 35 detects one of the five complex-inverse diffusing points where the accumulated slot S/N ratio is maximum, based on the result produced by the slot S/N ratio accumulative adder 34 in step S27.

The data decision unit 37 compares the threshold value Pth established in step S21 and an accumulated slot S/N ratio Psl at the point detected in step S27 with each other in step S28. If the accumulated slot S/N ratio Psl is equal to or greater than the threshold value Pth, then the data decision unit 37 determines that there is received data. If the accumulated slot S/N ratio Psl is smaller than the threshold value Pth, then the data decision unit 37 determines that there is no received data.

If the data decision unit 37 determines that there is received data, then the point detected as having the maximum accumulated slot S/N ratio by the maximum value detector 35 is outputted via the switch unit 38 to the symbol data selector 6 in step S29.

If the symbol data selector 6 is supplied with the point detected as having the maximum accumulated slot S/N ratio by the maximum value detector 35 via the switch unit 38, then the symbol data selector 6 outputs, to the circuit at the later stage, the accumulated and added symbol data at the point detected as having the maximum accumulated slot S/N ratio by the maximum value detector 35, of those symbol data accumulated and added by the symbol accumulative adder 2, and if the symbol data selector 6 is not supplied with the point detected as having the maximum accumulated slot S/N ratio by the maximum value detector 35 via the switch unit 38, then the symbol data selector 6 outputs, to the circuit at the later stage, the accumulated and added symbol data at the same point as the accumulated and added symbol data outputted in the preceding slot, of those symbol data accumulated and added by the symbol accumulative adder 2, in step S30.

4th Embodiment:

In the third embodiment, the data decision unit decides whether there is received data or not by comparing the S/N ratio accumulated and added in the slot rate interval with the predetermined threshold value. However, the data decision unit may decide whether there is received data or not by comparing the power value for each symbol with a predetermined threshold value.

Figure 12:
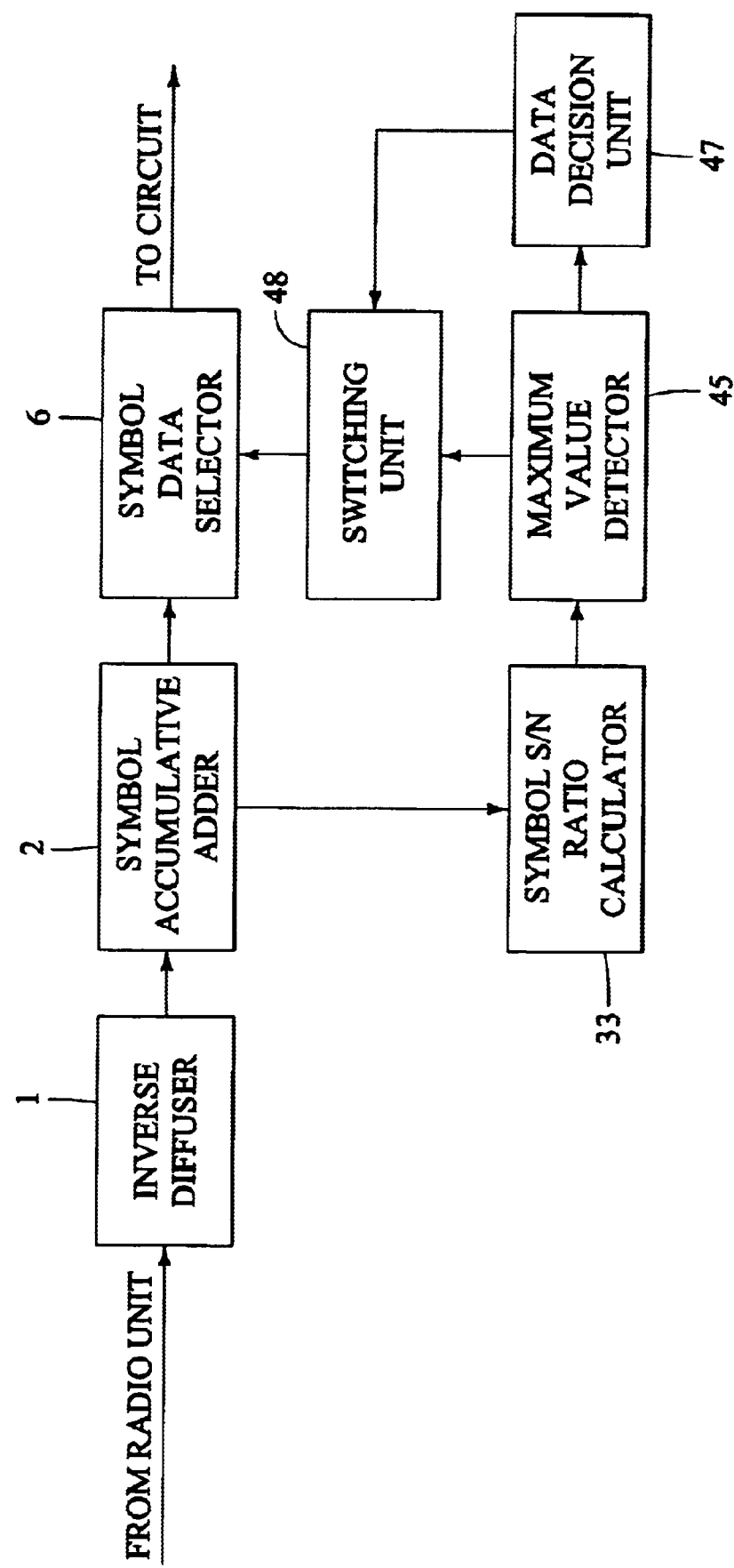
FIG. 12 is a block diagram of a finger receiver according to a fourth embodiment of the present invention, for use in the receiving circuit shown in FIG. 5.

FIG. 12 shows in block form a finger receiver according to a fourth embodiment of the present invention, for use as each of the finger receivers 13a through 13f in the receiving circuit shown in FIG. 5.

As shown in FIG. 12, the finger receiver comprises an inverse diffuser 1 for complex-inverse diffusing the data received via the antenna 11 and the radio unit 12, at each chip rate for five points of $-1/2\pi$, $-1/4\pi$, $0\pi$, $+1/4\pi$, $+1/2\pi$ at 16.384 MHz with respect to a reference point, a symbol accumulative adder 2 for accumulating and adding the data complex-inverse diffused by the inverse diffuser 1 in each symbol rate interval with respect to the above five points, a symbol S/N ratio calculator 33 for calculating and outputting S/N ratios of received data from symbol data accumulated and added by the symbol accumulative adder 2, a maximum value detector 45 for detecting one of the five complex-inverse diffusing points where the accumulated slot S/N ratio is maximum, based on the S/N ratios at the five points outputted from the symbol S/N ratio calculator 33, a data decision unit 47 for comparing the accumulated slot S/N ratio at the point detected as having the maximum accumulated slot S/N ratio by the maximum value detector 45 with a predetermined threshold value, and deciding whether there is received data or not based on the result of comparison, a switching unit 48 for outputting the point detected as having the maximum accumulated slot S/N ratio by the maximum value detector 45 only if the data decision unit 47 determines that there is received data, and a symbol data selector 6 for outputting, to a circuit at a later stage (not shown), the accumulated and added symbol data at the point detected as having the maximum accumulated slot S/N ratio by the maximum value detector 45, of those symbol data accumulated and added by the symbol accumulative adder 2, if the symbol data selector 6 is supplied with the point detected as having the maximum accumulated slot S/N ratio by the maximum value detector 45 via the switching unit 48, and outputting, to the circuit at the later stage, the accumulated and added symbol data at the same point as the accumulated and added symbol data outputted with a preceding symbol, of those symbol data accumulated and added by the symbol accumulative adder 2, if the symbol data selector 6 is not supplied with the point detected as having the maximum accumulated slot S/N ratio by the maximum value detector 45 via the switching unit 48.

Operation of the finger receiver constructed as shown in FIG. 12 will be described below.

Figure 13:
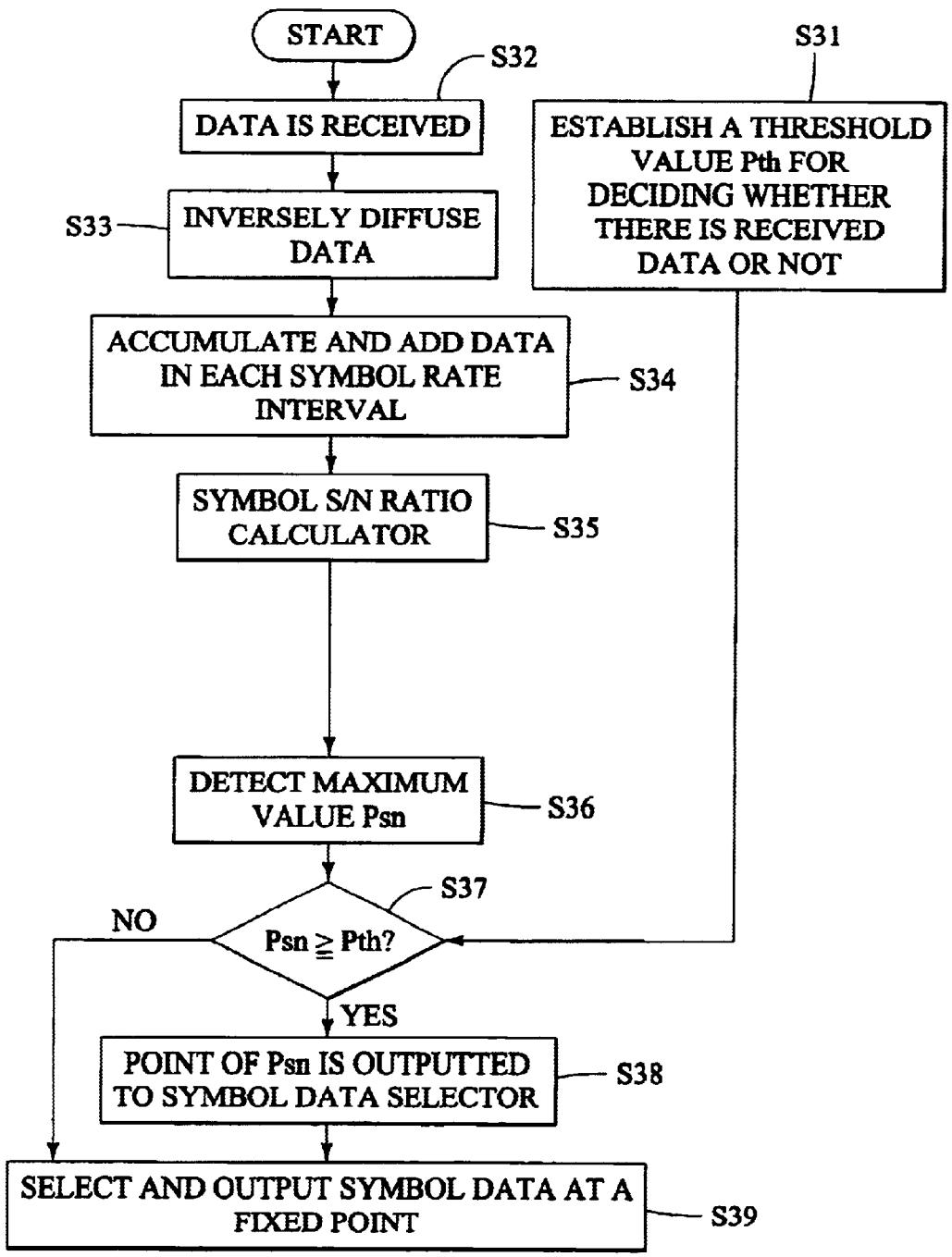
FIG. 13 is a flowchart of an operation sequence of the finger receiver shown in FIG. 12.

FIG. 13 shows an operation sequence of the finger receiver shown in FIG. 12.

The data decision unit 47 establishes a threshold value Pth for deciding whether there is received data or not in step S31. If the symbol S/N ratio calculated by the symbol S/N ratio calculator 33 is equal to or greater than the threshold value Pth established by the data decision unit 47, then the data decision unit 47 determines that there is received data.

Data is received via the antenna 11 and the radio unit 12 in step S32. Then, the inverse diffuser 1 inversely diffuses the received data at each chip rate for five points of $-1/2\pi$, $-1/4\pi$, $0\pi$, $+1/4\pi$, $+1/2\pi$ at 16.384 MHz with respect to a reference point in step S33.

Then, the symbol accumulative adder 2 accumulates and adds the data complex-inverse diffused by the inverse diffuser 1 in each symbol rate interval with respect to the above five points in step S34.

The symbol S/N ratio calculator 33 calculates S/N ratios of received data from symbol data accumulated and added by the symbol accumulative adder 2, and outputs the calculated S/N ratios at the five points in step S35.

Then, the maximum value detector 45 detects one of the five complex-inverse diffusing points where the symbol S/N ratio is maximum, based on the symbol S/N ratios at the five points outputted from the symbol S/N ratio calculator 33 in step S36.

The data decision unit 47 compares the threshold value Pth established in step S31 and a symbol S/N ratio Psn at the point detected in step S36 with each other in step S37. If the symbol S/N ratio Psn is equal to or greater than the threshold value Pth, then the data decision unit 47 determines that there is received data. If the symbol S/N ratio Psn is smaller than the threshold value Pth, then the data decision unit 47 determines that there is no received data.

If the data decision unit 47 determines that there is received data, then the point detected as having the maximum symbol S/N ratio by the maximum value detector 45 is outputted via the switch unit 48 to the symbol data selector 6 in step S38.

If the symbol data selector 6 is supplied with the point detected as having the maximum symbol S/N ratio by the maximum value detector 45 via the switch unit 48, then the symbol data selector 6 outputs, to the circuit at the later stage, the accumulated and added symbol data at the point detected as having the maximum symbol S/N ratio by the maximum value detector 45, of those symbol data accumulated and added by the symbol accumulative adder 2, and if the symbol data selector 6 is not supplied with the point detected as having the maximum symbol S/N ratio by the maximum value detector 45 via the switch unit 48, then the symbol data selector 6 outputs, to the circuit at the later stage, the accumulated and added symbol data at the same point as the accumulated and added symbol data outputted with the preceding symbol, of those symbol data accumulated and added by the symbol accumulative adder 2, in step S39.

In the first through fourth embodiments, the chip rate is divided into four timings, and the transmitted data is inversely diffused for five points of $-1/2\pi$, $-1/4\pi$, $0\pi$, $+1/4\pi$, $+1/2\pi$ at 16.384 MHz at each of the timings. The received data in a next slot at one of the points where the reception level is the highest is outputted to the circuit at the later stage. However, one data may be divided into four parts, and each data part may be processed in the same operation as described above.

With the arrangement of the present invention, as described above, in the finger receivers, the reception timing in each predetermined interval is divided into a plurality of timings, and the received data is inversely diffused at each of the timings. Based on the inversely diffused data, the timing where the reception level is the highest is detected, and data in a next interval is outputted at the detected timing. Therefore, the quality of received data can be increased.

Whether there is received data or not is decided based on the reception level at the timing where the reception level is the highest. If it is determined that there is received data, then data in a next interval is outputted at the timing where the reception level is the highest. If it is determined that there is no received data, then data in a next interval is outputted at the timing of presently outputting data. In such an arrangement, if the received data is burst data as in a paging channel, then since the detection of timing in the data is not reflected in the outputting of the data, the quality of received data can be increased even though the received data is burst data as in a paging channel.

While preferred embodiments of the present invention have been described using specific terms, such description is for illustrative purposes only, and it is to be understood that changes and variations may be made without departing from the spirit or scope of the following claims.

What is claimed is:

1. A receiving circuit comprising:
   an antenna and a radio unit for receiving data;
   a plurality of finger receivers for inversely diffusing the data received by the antenna and the radio unit in association with respective multiple paths; and
   a synthesizer for synthesizing the data inversely diffused by said finger receivers;
   each of said finger receivers comprising:
      means for dividing a reception timing in each predetermined interval into a plurality of timings, inversely diffusing the received data at each of the timings, detecting one of the timings where a reception level is highest based on the inversely diffused data, and outputting data in a next interval at the detected timing,
      means for deciding whether there is received data or not based on the reception level at the timing where the reception level is highest, outputting the data in the next interval at the timing where the reception level is highest if it is determined that there is received data, and outputting the data in the next interval at the timing of presently outputting the data if it is determined that there is no received data;
      an inverse diffuser for dividing a chip rate into a plurality of reception timings and complex-inverse diffusing data received via said antenna and said radio unit at each of said reception timings;
      a symbol accumulative adder for accumulating and adding the data complex-inverse diffused by said inverse diffuser in each symbol rate interval at each of said reception timings;
      a symbol power calculator for converting symbol data accumulated and added by said symbol accumulative adder into power values and outputting the power values;
      a slot power accumulative adder for accumulating and adding the power values at the reception timings outputted from said symbol power calculator in a slot rate interval;
      a maximum value detector for detecting one of the reception timings where an accumulated slot power value is maximum based on a result produced by said slot power accumulative adder;
      a data decision unit for deciding whether there is received data or not based on the accumulated slot power value at the reception timing detected as having the maximum accumulated slot power value by said maximum value detector; and
      a symbol data selector for outputting accumulated and added symbol data at the reception timing detected as having the maximum accumulated slot power value by said maximum value detector, of those symbol data accumulated and added by said symbol accumulative adder if said data decision unit determines that there is received data, and outputting accumulated and added symbol data at a same reception timing as the accumulated and added symbol data outputted in a preceding slot, of those symbol data accumulated and added by said symbol accumulative adder if said data decision unit determines that there is no received data.

2. A receiving circuit according to claim 1, wherein said data decision unit comprises means for comparing the accumulated slot power value at the reception timing detected as having the maximum accumulated slot power value by said maximum value detector, with a predetermined threshold value thereby to decide whether there is received data or not.

3. A receiving circuit according to claim 1, wherein each of said finger receivers has a switching unit for outputting the reception timing detected as having the maximum accumulated slot power value by said maximum value detector only if said data decision unit determines that there is received data; and
   said symbol data selector comprising means for outputting accumulated and added symbol data at the reception timing detected as having the maximum accumulated slot power value by said maximum value detector, of those symbol data accumulated and added by said symbol accumulative adder if said symbol data selector is supplied with the reception timing detected as having the maximum accumulated slot power value by said maximum value detector via said switching unit, and outputting accumulated and added symbol data at the same reception timing as the accumulated and added symbol data outputted in the preceding slot, of those symbol data accumulated and added by said symbol accumulative adder if said symbol data selector is not supplied with the reception timing detected as having the maximum accumulated slot power value by said maximum value detector via said switching unit.

4. A receiving circuit according to claim 2, wherein each of said finger receivers has a switching unit for outputting the reception timing detected as having the maximum accumulated slot power value by said maximum value detector only if said data decision unit determines that there is received data; and said symbol data selector comprising means for outputting accumulated and added symbol data at the reception timing detected as having the maximum accumulated slot power value by said maximum value detector, of those symbol data accumulated and added by said symbol accumulative adder if said symbol data selector is supplied with the reception timing detected as having the maximum accumulated slot power value by said maximum value detector via said switching unit, and outputting accumulated and added symbol data at the same reception timing as the accumulated and added symbol data outputted in the preceding slot, of those symbol data accumulated and added by said symbol accumulative adder if said symbol data selector is not supplied with the reception timing detected as having the maximum accumulated slot power value by said maximum value detector via said switching unit.

5. A receiving circuit comprising:

an antenna and a radio unit for receiving data;

a plurality of finger receivers for inversely diffusing the data received by the antenna and the radio unit in association with respective multiple paths; and a synthesizer for synthesizing the data inversely diffused by said finger receivers;

each of said finger receivers comprising:
  means for dividing a reception timing in each predetermined interval into a plurality of timings, inversely diffusing the received data at each of the timings, detecting one of the timings where a reception level is highest based on the inversely diffused data, and outputting data in a next interval at the detected timing,
  means for deciding whether there is received data or not based on the reception level at the timing where the reception level is highest, outputting the data in the next interval at the timing where the reception level is highest if it is determined that there is received data, and outputting the data in the next interval at the timing of presently outputting the data if it is determined that there is no received data;
  an inverse diffuser for dividing a chip rate into a plurality of reception timings and complex-inverse diffusing data received via said antenna and said radio unit at each of said reception timings;
  a symbol accumulative adder for accumulating and adding the data complex-inverse diffused by said inverse diffuser in each symbol rate interval at each of said reception timings;
  a symbol power calculator for converting symbol data accumulated and added by said symbol accumulative adder into power values and outputting the power values;
  a maximum value detector for detecting one of the reception timings where a symbol power value is maximum based on the power values at the reception timings outputted from said symbol power calculator;
  a data decision unit for deciding whether there is received data or not based on the symbol power value at the reception timing detected as having the maximum symbol power value by said maximum value detector; and
  a symbol data selector for outputting accumulated and added symbol data at the reception timing detected as having the maximum symbol power value by said maximum value detector, of those symbol data accumulated and added by said symbol accumulative adder if said data decision unit determines that there is received data, and outputting accumulated and added symbol data at a same reception timing as the accumulated and added symbol data outputted with a preceding symbol, of those symbol data accumulated and added by said symbol accumulative adder if said data decision unit determines that there is no received data.

6. A receiving circuit according to claim 5, wherein said data decision unit comprises means for comparing the symbol power value at the reception timing detected as having the maximum symbol power value by said maximum value detector, with a predetermined threshold value thereby to decide whether there is received data or not.

7. A receiving circuit according to claim 5, wherein each of said finger receivers has a switching unit for outputting the reception timing detected as having the maximum symbol power value by said maximum value detector only if said data decision unit determines that there is received data; and said symbol data selector comprising means for outputting accumulated and added symbol data at the reception timing detected as having the maximum symbol power value by said maximum value detector, of those symbol data accumulated and added by said symbol accumulative adder if said symbol data selector is supplied with the reception timing detected as having the maximum symbol power value by said maximum value detector via said switching unit, and outputting accumulated and added symbol data at the same reception timing as the accumulated and added symbol data outputted with the preceding symbol, of those symbol data accumulated and added by said symbol accumulative adder if said symbol data selector is not supplied with the reception timing detected as having the maximum symbol power value by said maximum value detector via said switching unit.

8. A receiving circuit according to claim 6, wherein each of said finger receivers has a switching unit for outputting the reception timing detected as having the maximum symbol power value by said maximum value detector only if said data decision unit determines that there is received data; and said symbol data selector comprising means for outputting accumulated and added symbol data at the reception timing detected as having the maximum symbol power value by said maximum value detector, of those symbol data accumulated and added by said symbol accumulative adder if said symbol data selector is supplied with the reception timing detected as having the maximum symbol power value by said maximum value detector via said switching unit, and outputting accumulated and added symbol data at the same reception timing as the accumulated and added symbol data outputted with the preceding symbol, of those symbol data accumulated and added by said symbol accumulative adder if said symbol data selector is not supplied with the reception timing detected as having the maximum symbol power value by said maximum value detector via said switching unit.

9. A receiving circuit comprising:
an antenna and a radio unit for receiving data;
a plurality of finger receivers for inversely diffusing the data received by the antenna and the radio unit in association with respective multiple paths; and
a synthesizer for synthesizing the data inversely diffused by said finger receivers;
each of said finger receivers comprising:
  means for dividing a reception timing in each predetermined interval into a plurality of timings, inversely diffusing the received data at each of the timings, detecting one of the timings where a reception level is highest based on the inversely diffused data, and outputting data in a next interval at the detected timing,
  means for deciding whether there is received data or not based on the reception level at the timing where the reception level is highest, outputting the data in the next interval at the timing where the reception level is highest if it is determined that there is received data, and outputting the data in the next interval at the timing of presently outputting the data if it is determined that there is no received data;
  an inverse diffuser for dividing a chip rate into a plurality of reception timings and complex-inverse diffusing data received via said antenna and said radio unit at each of said reception timings;
  a symbol accumulative adder for accumulating and adding the data complex-inverse diffused by said inverse diffuser in each symbol rate interval at each of said reception timings;
  a symbol S/N ratio calculator for calculating S/N ratios of received data from symbol data accumulated and added by said symbol accumulative adder and outputting the calculated S/N ratios;
  a slot S/N ratio accumulative adder for accumulating and adding the S/N ratios at the reception timings outputted from said symbol S/N ratio calculator;
  a maximum value detector for detecting one of the reception timings where an accumulated slot S/N ratio is maximum based on a result produced by said slot S/N ratio accumulative adder;
  a data decision unit for deciding whether there is received data or not based on the accumulated slot S/N ratio at the reception timing detected as having the maximum accumulated slot S/N ratio by said maximum value detector; and
  a symbol data selector for outputting accumulated and added symbol data at the reception timing detected as having the maximum accumulated slot S/N ratio by said maximum value detector, of those symbol data accumulated and added by said symbol accumulative adder if said data decision unit determines that there is received data, and outputting accumulated and added symbol data at a same reception timing as the accumulated and added symbol data outputted in a preceding slot, of those symbol data accumulated and added by said symbol accumulative adder if said data decision unit determines that there is no received data.

10. A receiving circuit according to claim 9, wherein said data decision unit comprises means for comparing the accumulated slot S/N ratio at the reception timing detected as having the maximum accumulated slot S/N ratio by said maximum value detector, with a predetermined threshold value thereby to decide whether there is received data or not.

11. A receiving circuit according to claim 9, wherein each of said finger receivers has a switching unit for outputting the reception timing detected as having the maximum accumulated slot S/N ratio by said maximum value detector only if said data decision unit determines that there is received data; and
said symbol data selector comprising means for outputting accumulated and added symbol data at the reception timing detected as having the maximum accumulated slot S/N ratio by said maximum value detector, of those symbol data accumulated and added by said symbol accumulative adder if said symbol data selector is supplied with the reception timing detected as having the maximum accumulated slot S/N ratio by said maximum value detector via said switching unit, and outputting accumulated and added symbol data at a same reception timing as the accumulated and added symbol data outputted in the preceding slot, of those symbol data accumulated and added by said symbol accumulative adder if said symbol data selector is not supplied with the reception timing detected as having the maximum accumulated slot S/N ratio by said maximum value detector via said switching unit.

12. A receiving circuit according to claim 10, wherein each of said finger receivers has a switching unit for outputting the reception timing detected as having the maximum accumulated slot S/N ratio by said maximum value detector only if said data decision unit determines that there is received data; and
said symbol data selector comprising means for outputting accumulated and added symbol data at the reception timing detected as having the maximum accumulated slot S/N ratio by said maximum value detector, of those symbol data accumulated and added by said symbol accumulative adder if said symbol data selector is supplied with the reception timing detected as having the maximum accumulated slot S/N ratio by said maximum value detector via said switching unit, and outputting accumulated and added symbol data at a same reception timing as the accumulated and added symbol data outputted in the preceding slot, of those symbol data accumulated and added by said symbol accumulative adder if said symbol data selector is not supplied with the reception timing detected as having the maximum accumulated slot S/N ratio by said maximum value detector via said switching unit.

13. A receiving circuit comprising:
an antenna and a radio unit for receiving data;
a plurality of finger receivers for inversely diffusing the data received by the antenna and the radio unit in association with respective multiple paths; and
a synthesizer for synthesizing the data inversely diffused by said finger receivers;
each of said finger receivers comprising:
  means for dividing a reception timing in each predetermined interval into a plurality of timings, inversely diffusing the received data at each of the timings, detecting one of the timings where a reception level is highest based on the inversely diffused data, and outputting data in a next interval at the detected timing,
  means for deciding whether there is received data or not based on the reception level at the timing where the reception level is highest, outputting the data in the next interval at the timing where the reception level is highest if it is determined that there is received data, and outputting the data in the next interval at the timing of presently outputting the data if it is determined that there is no received data;

an inverse diffuser for dividing a chip rate into a plurality of reception timings and complex-inverse diffusing data received via said antenna and said radio unit at each of said reception timings;

a symbol accumulative adder for accumulating and adding the data complex-inverse diffused by said inverse diffuser in each symbol rate interval at each of said reception timings;

a symbol S/N ratio calculator for calculating S/N ratios of received data from symbol data accumulated and added by said symbol accumulative adder and outputting the calculated S/N ratios;

a maximum value detector for detecting one of the reception timings where a symbol S/N ratio is maximum based on the S/N ratios at the reception timings outputted from said symbol S/N ratio calculator;

a data decision unit for deciding whether there is received data or not based on the symbol S/N ratio at the reception timing detected as having the maximum symbol S/N ratio by said maximum value detector; and a symbol data selector for outputting accumulated and added symbol data at the reception timing detected as having the maximum symbol S/N ratio by said maximum value detector, of those symbol data accumulated and added by said symbol accumulative adder if said data decision unit determines that there is received data, and outputting accumulated and added symbol data at a same reception timing as the accumulated and added symbol data outputted with a preceding symbol, of those symbol data accumulated and added by said symbol accumulative adder if said data decision unit determines that there is no received data.

14. A receiving circuit according to claim 13, wherein said data decision unit comprises means for comparing the symbol S/N ratio at the reception timing detected as having the maximum symbol S/N ratio by said maximum value detector, with a predetermined threshold value thereby to decide whether there is received data or not.

15. A receiving circuit according to claim 13, wherein each of said finger receivers has a switching unit for outputting the reception timing detected as having the maximum symbol S/N ratio by said maximum value detector only if said data decision unit determines that there is received data; and said symbol data selector comprising means for outputting accumulated and added symbol data at the reception timing detected as having the maximum symbol S/N ratio by said maximum value detector, of those symbol data accumulated and added by said symbol accumulative adder if said symbol data selector is supplied with the reception timing detected as having the maximum symbol S/N ratio by said maximum value detector via said switching unit, and outputting accumulated and added symbol data at a same reception timing as the accumulated and added symbol data outputted with the preceding symbol, of those symbol data accumulated and added by said symbol accumulative adder if said symbol data selector is not supplied with the reception timing detected as having the maximum symbol S/N ratio by said maximum value detector via said switching unit.

16. A receiving circuit according to claim 14, wherein each of said finger receivers has a switching unit for outputting the reception timing detected as having the maximum symbol S/N ratio by said maximum value detector only if said data decision unit determines that there is received data; and said symbol data selector comprising means for outputting accumulated and added symbol data at the reception timing detected as having the maximum symbol S/N ratio by said maximum value detector, of those symbol data accumulated and added by said symbol accumulative adder if said symbol data selector is supplied with the reception timing detected as having the maximum symbol S/N ratio by said maximum value detector via said switching unit, and outputting accumulated and added symbol data at a same reception timing as the accumulated and added symbol data outputted with the preceding symbol, of those symbol data accumulated and added by said symbol accumulative adder if said symbol data selector is not supplied with the reception timing detected as having the maximum symbol S/N ratio by said maximum value detector via said switching unit.

17. A mobile terminal having a receiving circuit according to claim 1.

18. A mobile terminal having a receiving circuit according to claim 2.

19. A mobile terminal having a receiving circuit according to claim 3.

20. A mobile terminal having a receiving circuit according to claim 5.

21. A mobile terminal having a receiving circuit according to claim 6.

22. A mobile terminal having a receiving circuit according to claim 7.

23. A mobile terminal having a receiving circuit according to claim 9.

24. A mobile terminal having a receiving circuit according to claim 10.

25. A mobile terminal having a receiving circuit according to claim 11.

26. A mobile terminal having a receiving circuit according to claim 13.

27. A mobile terminal having a receiving circuit according to claim 14.

28. A mobile terminal having a receiving circuit according to claim 15.

* * * * *